United States Patent [19]
Francis, Jr.

[11] 3,855,895
[45] Dec. 24, 1974

[54] ONE-QUARTER TURN FASTENER
[75] Inventor: Ajax C. Francis, Jr., Newark, N.J.
[73] Assignee: Western Electric Company, Incorporated, New York, N.Y.
[22] Filed: Dec. 27, 1972
[21] Appl. No.: 318,789

[52] U.S. Cl.......................... 85/1 L, 85/7, 85/32 V
[51] Int. Cl............................................. F16b 21/18
[58] Field of Search............... 85/1 L, 36, 32 V, 8.8, 85/7; 24/221 R, 221 A

[56] References Cited
UNITED STATES PATENTS

| | | | |
|---|---|---|---|
| 1,251,772 | 1/1918 | Guett | 85/1 L |
| 2,167,176 | 7/1939 | Grassberger | 85/1 L |
| 2,328,587 | 9/1943 | Simmons | 85/36 |
| 2,372,566 | 3/1945 | Gazley | 85/32 V |

*Primary Examiner*—Edward C. Allen
*Attorney, Agent, or Firm*—W. O. Schellin; R. Y. Peters

[57] ABSTRACT

A one-quarter turn fastener for interjoining a plurality of plates includes a shaft having two opposed substantially parallel surfaces and two opposed convex threaded surfaces. These surfaces extend along the shaft, the parallel one being adjacent the threaded ones. A head is fixed to one end of the shaft. A retainer formed of a resilient, continuous wire is engageable with the threaded surfaces. The retainer is formed into a substantially planar configuration having an internal opening defined by the inner edges of the wire and a gap defined by one end of the wire and one of the edges. The gap, which communicates with the opening, and its configuration permits several things. First, the gap and its configuration permit the smallest lateral dimension of the shaft to pass through the gap to make possible the engagement of the threaded surfaces of the shaft with the wire. Second, the gap and its configuration permit the shaft to be rotated one-quarter of a turn and then be stopped by the inner edges of the wire. The shaft may be inserted into the retainer at any point along its length to join the plates having an indeterminate total thickness which is less than the length of the shaft.

2 Claims, 4 Drawing Figures

ONE-QUARTER TURN FASTENER

BACKGROUND OF THE INVENTION

1. Field of the Invention

This invention relates to one-quarter turn fasteners and more particularly to such fasteners for interjoining a plurality of plates of various thicknesses.

2. Discussion of the Prior Art

One-quarter turn fasteners are well known in the art. Such a fastener generally has two elements: an elongated member or stud and a mating locking member or retainer. The stud is inserted into the retainer in straight-line motion in the direction of its longitudinal axis and, then rotated one-quarter of a turn about its longitudinal axis to lock the stud to the retainer.

A head on the stud and a shoulder on the retainer provide a pair of opposed surfaces between which flat sheets or plates may be clamped to interjoin such plates. Frequently, the thickness between plates to be interjoined is the same on a great number of like items of manufacture.

On such items a known one-quarter turn fastener may be used. Such a fastener has no adjustment in the spacings between the pairs of opposed surfaces of the fasteners at which the studs are locked to the respective retainers. Because the thickness between plates is known to be of a predetermined value, such adjustment is not required. On the other hand, because the fasteners lack such adjustment, a design change in such items to alter the thicknesses of the plates to be interjoined requires a related change in the length of the stud of the fastener.

Other fasteners provide a limited longitudinal adjustment between the opposed clamping surfaces of the fasteners. For instance, a loose-leaf paper binder employs one-quarter turn fasteners having studs which are inserted into and locked to tubular retainers. Minimum spacings between the opposed clamping surfaces are dictated by the lengths of the retainers when the studs are fully inserted therein. The spacings between the surfaces can be increased to something less than the total lengths of the studs and the tubular retainers combined when the studs are inserted to less than their full lengths into the retainers.

Interjoining a plurality of plates of various thicknesses has, in the past, been done with a number of different fasteners having studs of various lengths. It is desirable however, to interjoin these plates with studs of a single, preselected, convenient length. It is further desirable that the fasteners do not require minimum spacings between opposed clamping surfaces.

SUMMARY OF THE INVENTION

It is, therefore, an object of this invention to provide a new one-quarter turn fastener which permits a longitudinal adjustment of an elongated member of the fastener to interjoin a plurality of plates of various thicknesses.

It is another object of the invention to provide a locking member which is simple and inexpensive to manufacture.

It is a further object of the invention to incorporate a simple stop means into a locking member to restrict the path of rotation of an elongated member after insertion.

In accordance with these and other objects, a fastener includes an elongated member having two opposed, substantially parallel surfaces and two opposed, convex threaded surfaces. These surfaces extend the length of the member, and the parallel surfaces are adjacent to the threaded surfaces. A head is fixed to one end of the elongated member. A resilient, continuous, wire-like member is engageable with the threaded surfaces and is formed into a substantially planar configuration which has an opening defined by the inner edges of the wire-like member. A gap is defined by one end of the wire-like member and one of the inner edges. The gap leads into such opening and permits a smallest lateral dimension of the elongated member to pass therethrough to permit the threaded surfaces of the elongated member to engage the wire-like member and to permit the elongated member to be rotated one-quarter turn. Upon rotation, the inner edges of the wire-like member stop the elongated member.

BRIEF DESCRIPTION OF THE DRAWING

Other objects, advantages and features of the invention will be apparent from the following detailed description thereof, in which.

DETAILED DESCRIPTION

Figure 1:
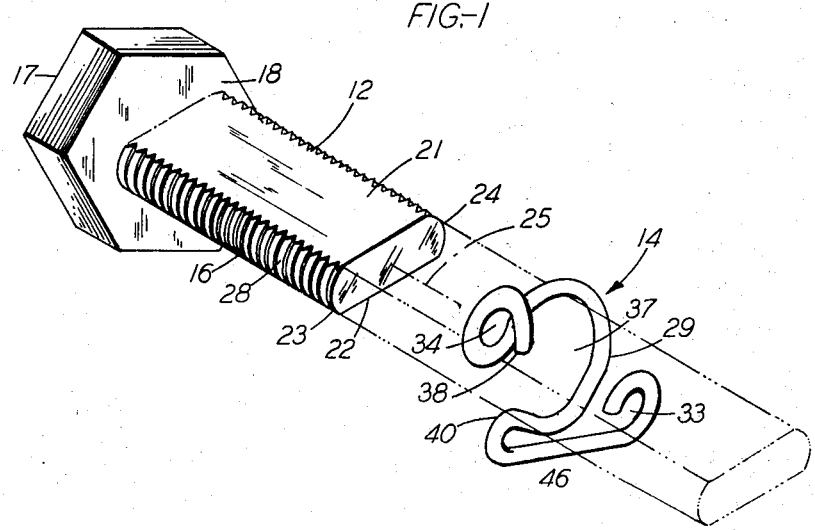
FIG. 1 is an isometric view of one-quarter turn fastener.

Referring now to FIG. 1, a one-quarter turn fastener is shown which is designated generally by numeral 11. Two components make up the fastener 11, one of which is an elongated member or stud 12 which is insertible into the second component, a locking member or retainer 14. The stud 12 includes a cylindric portion 16 and a head 17 fixed to one end of the cylindrical portion 16. The head 17 is larger in cross section than the cylindric portion 16, thus, a surface 18 of the head 17 adjacent the cylindric portion 16 forms a shoulder therewith.

The cylindric portion 16 has an oblong cross section 19, bounded by a cut through two pairs of diametrically opposed surfaces. Two opposed, flattened surfaces 21 and 22 form in section two long sides across the minor diameter or the smallest dimension of the oblong section 19. Two opposed convex surfaces 23 and 24 form in section two short sides across the major diameter or the largest dimension of such oblong section 19. All four surfaces 21 through 24 extend parallel to a common longitudinal axis 25 of the stud 12.

A plurality of parallel grooves 28 extends at least over substantial portions of the convex surfaces 23 and 24. The grooves 28 are adjacent to each other and lie in planes substantially perpendicular to the longitudinal axis 25 of the stud 12.

In a specific embodiment, the convex surfaces 23 and 24 are diametrically opposed surface sections of a circular cylinder and the grooves 28 are segments of threads on such convex surfaces. Of course, the threads follow a helix about the longitudinal axis 25 of the stud 12 and to the extent of the pitch of the helix the threads or grooves 28 digress from planes truly perpendicular to the longitudinal axis 25.

The stud 12 is inserted into the retainer 14 as shown in FIG. 1. After insertion, a quarter turn of the stud 12 locks the stud to the retainer 14.

The retainer 14 is preferably formed of a single piece of wire 29 into a substantially planar configuration. Two looped apertures 33 and 34, one at each end of the wire, permit the retainer 14 to be attached to a support plate 35 (shown in FIG. 4) by any of a number of known means, such as the rivets 36 in FIG. 4. A center portion of the wire 29 defines a U-shaped opening 37 which admits the cylindric portion 16 of the stud 12.

Figure 2:
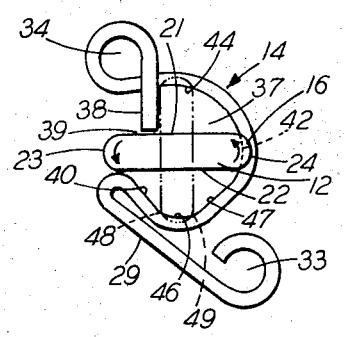
FIG. 2 is an end view of the fastener of FIG. 1 after insertion of an elongated member of the fastener into a locking member of the fastener.

In FIG. 2 a plan view of the retainer 12 is shown. The cylindric portion 16 is oriented with respect to the opening 37 in the retainer 12 to permit the insertion of the cylindric portion 16 into the opening 37. An end portion 38 of the retainer 14 extends from the aperture 34 into the opening 37 to form a gap 39 between the end portion and a leg portion 40. The width of the gap 39 is such that the smallest dimension of the cylindric portion 16 can be inserted into the gap 39.

As the stud 12 is inserted into the retainer 14, the convex surface 24 passes adjacent a bottom portion 42 of the U-shaped opening 37 and the flattened surfaces 21 and 23 pass through the gap 39. After insertion of the stud 12 to any desired depth, further longitudinal movement of the stud is prevented by rotating the stud approximately 90° or one-quarter of a turn in the direction indicated by the arrow in FIG. 2.

By rotating portion stud 12, the convex surface 23 contacts the leg potion 40 of the opening 37 while the convex surface 24 moves into contact with a second leg portion 44 opposite the portion 40 of the opening 37.

The space between the portion 40 and the opposite portion 44 across the opening 37 is slightly less than the dimension between the convex surfaces 23 and 24. As the stud 12 rotates, the cylindric portion 16 exerts a camming force on the opposed wire portions 40 and 44 and the space between these portions 40 and 44 resiliently increases. Because of the resiliency of the wire 29, the portions 40 and 44 are urged into opposed grooves 28 of the respective surfaces 23 and 24.

The diameter of the wire 29 is chosen in relation to the width and the depth of the grooves 28 to permit the wire 29 to be urged into such grooves 28 on the surfaces 23 and 24. The engagement of the wire portions 40 and 44 with the grooves 28 prevents further movement of the stud 12 in the direction of its longitudinal axis 25. Further rotation of the stud 12 in the direction indicated, moves the stud 12 into a locked position.

As the stud 12 rotates toward the locked position, as shown in phantom lines in FIG. 2, the surface 24 moves along the second leg portion 44 into contact with the wire end portion 38. Simultaneously therewith the convex surface 23 moves along the leg portion 40 toward a wire portion 46. As the surface 21 contacts the end portion 38, the surface 23 is located in full engagement or contact with the wire portion 46 and the rotation of the stud 12 stops.

Continued rotational movement of the stud 12 is arrested by: (a) the end portion 38 contacting the surface 21 of the stud 12; and (b) a detenting of the surface 23 in the curvature of the wire portion 46. This detenting is achieved by a larger radius of curvature in a wire portion 47 than the respective radius of the adjacent portion 46.

In addition, an overcentering action is achieved by a smaller amount of curvature with a correspondingly larger radius on the portion 40 than the respective amount of curvature and radius on the wire portion 46. Varying the radii of curvature of the respective portions results in the distance between the portion 46 and the opposed portion 44 being greater than the distance between either the portions 40 and 44 or the portions 47 and 44.

Consequently, as the surface 23 moves along the portion 40 toward the portion 46, because of the resiliency of the wire 29, the portion 40 moves toward the end portion 38 after it had been urged away from the end portion 38 during the initial rotation of the stud 12. As the surface 23 reaches the locked position, corners 48 and 49 between the surface 23 and the surfaces 21 and 22 are in intimate contact with the portions 40 and 47, respectively. Any rotation of the stud 12, either in the direction of the arrow or in the opposite direction, will tend to urge the wire portions 44 and 46 away from each other. Consequently, the resiliency of the wire 29 tends to center the surface 23 on the wire portion 46 and to seat the stud 12 in the locked position. In this locked position the portion 47 bears against the corner 49 and acts as a counterstop to the end portion 38 to arrest further rotation of the stud 12.

The described retainer 14 performs two functions: (1) it engages a pair of grooves 28 in opposed surfaces to prevent longitudinal movement of the stud 12; and (2) it seats the stud in the locked position to prevent rotational movement which may cause the retainer 14 to disengage from the grooves 28. These functions do not depend on a particular depth of insertion of the stud 12 into the retainer 14. Instead, the retainer 14 acts on any engaging pair of grooves 28 of the cylindric portion 16 to lock the stud 12 when it is rotated after insertion to any depth.

Figure 3:
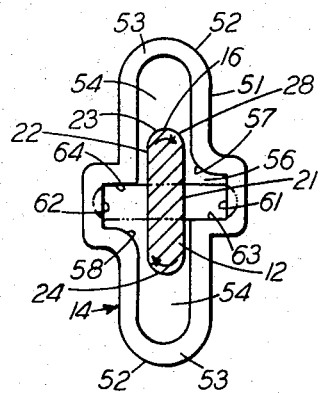
FIG. 3 is an end view of an alternate embodiment of the fastener of FIG. 1.

In FIG. 3, as an alternate embodiment of the retainer 14, a wire 51 is formed into an elongated, closed-loop configuration. At each end 52 across the longest dimension of the retainer 14, the wire 51 forms a semi-annular shoulder 53. A space 54 associated with each of the shoulders 53 accepts a pair of rivets or similar conventional fasteners (see FIG. 4, numeral 36) to attach the retainer 14 to the support plate 35. An opening 56 centered on the retainer 14 admits the stud 12 when the stud is oriented such that the grooved surfaces 23 and 24 face the ends 52. In FIG. 3 the cylindrical portion 16 of the stud 12, shown in phantom lines, is oriented to permit the stud 12 to be inserted into the retainer 14. After the stud 12 is inserted to a desired depth, rotation of the stud 12 in the direction of the arrow brings the grooved surfaces 23 and 24 into contact with two opposed cam faces 57 and 58 of the wire 51. These faces 57 and 58 resiliently cam outward as the cylindric portion 16 rotates into contact therewith.

Upon further rotation of the stud 12 the grooved surfaces 23 and 24 move out of contact with the cam faces 57 and 58 and into contact with opposed inner edges 61 and 62 of the wire 51. During this movement, the resiliency of the faces 57 and 58 urges the elongated member in the direction of such movement and into contact with stops 63 and 64.

These stops 63 and 64 are located in the path of the rotating major diameter of the cylindric portion 16. As the grooves 28 on the respective surfaces 23 and 24 move into full engagement with the opposed inner edges 61 and 62, the stops 63 and 64 contact the flattened surfaces 21 and 22 to limit further rotational movement of the stud 12.

Figure 4:
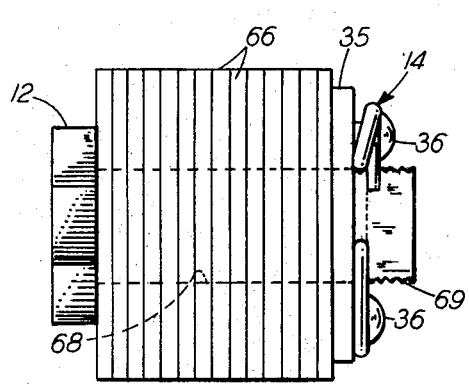
FIG. 4 is a side view of the fastener of FIG. 1 locking a plurality of plates of various thicknesses to a support plate.

In FIG. 4 a plurality of plates 66 are held in place by the fastener 11. The retainer 14 is fastened to the support plate 35 in a conventional manner, as for instance, with rivets 36, and the stud 12 is inserted through an aperture 52 in each of the plates 66 and in the support plate 35.

By closely packing the plates 66 against the support plate 35 and against each other, and by inserting the stud 12 through the apertures 68 to bring the head 17 into contact with the outermost plate 66, the plates are interjoined. A subsequent one-quarter turn on the head 17 of the stud 12 locks the plates 66 against the support plate 35.

Variations in the thicknesses of the plates 66 or changes in the number of the plates do not affect the operation of the fastener as long as the total thickness of the combined plates permits the engagement of the stud 12 with the retainer 14. A single length of the cylindric portion 16 of the stud 12 is therefore sufficient to accommodate a change in the total thickness of the plates 66 and a variation in the number of plates 66 which are to be fastened to the common support plate 35. A variation in the number of plates 66 or in the total thickness of the packed plates simply results in a change of the length of an end 69 extending past the support plate 35 and the retainer 14.

The description of the invention in terms of a specific embodiment is for illustrative purposes only and is not to be regarded as limiting the scope of the invention. For instance, a reduction in the size in the support plate 35 to substantially that of the head 17 is well within the scope of the present invention. Other changes and modifications can be made without departing from the scope and spirit of the invention.

What is claimed is:

1. A fastener comprising:
   a. an elongated member including a head at one end thereof, and a cylindric portion extending from said head, said cylindric portion having an oblong cross section with a width between two substantially parallel surfaces and a length between two convex, grooved surfaces, the grooves in each surface being parallel to each other and in planes substantially perpendicular to the longitudinal axis of said elongated member; and
   b. a retainer of a single wire having been formed into a substantially planar configuration, said wire defining an aperture loop at each of opposite ends of said retainer and a substantially U-shaped opening between said aperture loops, said U-shaped opening being defined by first and second leg portions of said wire, each being adjacent one of the aperture loops and substantially opposite the other, and a bottom portion of the wire connecting the two leg portions, the U-shaped opening having a gap opposite said bottom portion, said gap being defined between the first leg portion and an end of the wire extending from the aperture loop adjacent the second leg portion across said second leg portion into the U-shaped opening, said configuration permitting the elongated member to be inserted through the U-shaped opening, the gap admitting the width of the oblong cross section, the length thereof extending through the gap toward the bottom portion of the wire, such that after insertion, a quarter-turn of the elongated member engages the grooved surfaces with the leg portions of the retainer to inhibit further longitudinal movement and the end of the wire stops further rotational movement of the elongated member.

2. A fastener, which comprises:
   an elongated member including a head, and a cylindric portion extending from the head, the cylindric portion having an oblong cross section with a minor diameter between two substantially parallel surfaces and a major diameter between two convex, grooved surfaces, the grooves in each surface being skewed with respect to the longitudinal axis of the cylindric portion and being located adjacent each other over substantially the full length of the convex surfaces; and
   a locking member, formed of a single wire, having an opening for receiving the cylindric portion of the elongated member and including first and second portions of said wire resiliently spaced opposite one another for engaging a groove on each of the convex surfaces upon rotation of the elongated member in the opening, and
   an end portion of said wire for limiting the rotation of the elongated member after engagement of the first and second wire portions with the grooves, the end portion crossing one of the first two portions, to be disposed in the path of the rotating major diameter of the oblong section of the elongated member.

* * * * *

UNITED STATES PATENT OFFICE
CERTIFICATE OF CORRECTION

Patent No. 3,855,895  Dated December 24, 1974

Inventor(s) AJAX C. FRANCIS

It is certified that error appears in the above-identified patent and that said Letters Patent are hereby corrected as shown below:

Column 3, line 32, "portion" should be --the--.

Signed and sealed this 4th day of March 1975.

(SEAL)
Attest:

RUTH C. MASON
Attesting Officer

C. MARSHALL DANN
Commissioner of Patents
and Trademarks